United States Patent
Gosdin et al.

(10) Patent No.: US 6,995,686 B2
(45) Date of Patent: Feb. 7, 2006

(54) WEATHER INFORMATION DISSEMINATION SYSTEM FOR MOBILE VEHICLES

(75) Inventors: Malcom E. Gosdin, Merritt Island, FL (US); Michael Paul Zeitfuss, Satellite Beach, FL (US); Youssef Sleiman, Indian Harbour Beach, FL (US); John R. Doner, Melbourne, FL (US); Kenneth G. Bath, Melbourne, FL (US); Michael Edwards, Indialantic, FL (US); Stacey Travis Simmons, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 133 days.

(21) Appl. No.: 10/633,406

(22) Filed: Aug. 1, 2003

(65) Prior Publication Data

US 2005/0024236 A1 Feb. 3, 2005

(51) Int. Cl.
*G08G 1/09* (2006.01)
(52) U.S. Cl. .................. 340/905; 340/601; 340/539.28
(58) Field of Classification Search ................ 340/905, 340/995.1, 995.17, 286.02, 286.14, 539.11, 340/539.13, 539.26, 539.28, 601; 702/3, 702/4; 455/150.1, 179.1
See application file for complete search history.

(56) References Cited

U.S. PATENT DOCUMENTS

| | | | |
|---|---|---|---|
| 4,249,174 A | 2/1981 | Lucchi et al. | |
| 5,265,024 A | 11/1993 | Crabill et al. | |
| 5,929,922 A | 7/1999 | Stevens et al. | |
| 6,014,606 A | 1/2000 | Tu | |
| 6,154,143 A | 11/2000 | Robinson | |
| 6,209,132 B1 * | 3/2001 | Harrison et al. | 725/141 |
| 6,240,369 B1 * | 5/2001 | Foust | 702/3 |
| 6,275,774 B1 * | 8/2001 | Baron et al. | 702/3 |
| 6,330,334 B1 | 12/2001 | Ryan | |
| 6,542,825 B2 * | 4/2003 | Jones et al. | 702/3 |
| 6,654,689 B1 * | 11/2003 | Kelly et al. | 702/3 |
| 6,728,522 B1 * | 4/2004 | Marrah et al. | 455/179.1 |

OTHER PUBLICATIONS www.rmstek.com; New Flitesoft Update: Always Stay Current; Feb. 18, 2003.
www.anywheremap.com; Taking Aviation to New Heights; Feb. 18, 2003.
www.echoflight.com; Welcome to Echo Flight, the Leader in Data Link Weather; Feb. 18, 2003.

* cited by examiner

*Primary Examiner*—Van T. Trieu (74) *Attorney, Agent, or Firm*—John L. DeAngelis, Jr.; Beusse Brownlee Wolter Mora & Maire, P.A.

(57) ABSTRACT

A method and apparatus for disseminating weather products, based on raw weather data provided by various weather condition sensors, to a mobile vehicle. The weather products are formed as web pages and transmitted to the mobile vehicle during the vertical blanking interval of a broadcast television signal. The weather products are received and displayed within the vehicle under control of a web browser.

34 Claims, 3 Drawing Sheets

FIG. 1

| REGION RADAR | ROUTE RADAR | WINDS ALOFT |
|---|---|---|
| AIRMETS SIGMETS | FREEZING LEVEL | WEATHER DEPICTION |
| ROUTE OBS 1 | ROUTE OBS 2 | ROUTE OBS 3 |

WEATHER INFORMATION DISSEMINATION SYSTEM FOR MOBILE VEHICLES

FIELD OF THE INVENTION

This invention relates generally to weather information systems for mobile vehicles, and specifically to a system for providing current weather data to such mobile vehicles.

BACKGROUND OF THE INVENTION

For obvious reasons related to safety, comfort and route-planning, operators of mobile vehicles require accurate real-time weather information. Depending upon the type of mobile vehicle, the weather information can be necessary for situational awareness, tactical planning, resource protection and operational safety. For example, aircraft pilots require timely and accurate weather data to make informed decisions during both the pre-flight planning process and while in flight. For flight planning purposes, the pilot needs to know current weather conditions at the departure location, and forecast weather conditions for the intended route of flight and the planned destination. Once en route, the pilot should maintain real-time awareness of actual and forecast weather conditions for the remaining flight route and also the intended destination and alternative destinations.

Several weather information delivery systems are available today, primarily intended for aircraft. Generally these systems do not provide coverage for vehicles operating on the ground or at low altitudes. Such systems require the construction of hundreds of communications ground stations, representing a considerable up-front investment, to provide service to users. Also the range of these systems is limited. Available satellite-based systems offer lower up-front costs, but typically cover only the land mass of the continental United States, and therefore are not available to ocean-going vessels.

Disadvantageously, the known weather information communications systems operate at relatively low data rates (for example, 9600 bps), thus requiring several seconds or even minutes to download image-based weather data. Higher data rate systems (up to about 31,500 bps) are available, but these require the use of expensive receiving equipment. Certain available commercial data communications services charge the receiving user on a per kilobyte or a per image basis. These charging practices, which result in relatively high costs for receiving weather data, disincentivize the non-commercial operator from frequent use for receiving real-time situational weather data.

The weather resources available to an aircraft pilot offer an illustrative example of currently available weather information systems. The present National Airspace System (NAS) weather support system provides extensive weather data for pre-flight planning, and limited weather information during flight. Typically, this weather data is received verbally during the pilot's pre-flight weather briefing. During in-person weather briefings the pilot is provided with weather maps of current and forecast weather conditions. Also, print-outs of weather satellite images and weather radar displays can be provided to the pilot during the briefing. During flight, verbal communications with air traffic controllers offers an opportunity for the pilot to collect up-to-date weather information, although the information is provided verbally and based on the controller's interpretation of available weather information. Also, en route alpha-numeric messages are provided to the cockpit to describe generally the weather en route and at the intended destination, but these messages are available only to airlines and transports equipped with ACARS (Aircraft Communicating Addressing and Reporting System) radio receiving systems.

Commercial aircraft generally also employ an onboard weather radar to determine the weather conditions along the intended en route flight path. Such weather radar systems are expensive, complex and require dedicated structural elements on the aircraft. For instance, a weather radar system requires the installation of a relatively large antenna and consumes a fair amount of aircraft power for the radar transmitter. The weather radar systems provides a view of oncoming weather over a range of approximately 150 miles. The pilot can thus alter his en route path to avoid localized inclement weather when detected by the weather radar and when route deviations are authorized by air traffic controllers.

The availability of en route weather information is also critical to the general aviation pilot, but general aviation aircraft are typically not equipped with a weather radar system. It is known that, for instance, during a four hour general aviation flight over a 500 mile route with thunderstorms forecast at about the halfway point, the National Airspace System weather support system would produce almost 2000 individual weather observations and forecasts that could be used to assimilate a detailed weather information picture during that flight, and thus allow the pilot to avoid the thunderstorms. It is obviously impractical for the pilot to request, receive and assimilate this amount of data directly. Therefore, the conventional practice is for the pilot to concentrate on the weather at the destination (and alternate destinations) during pre-flight planning, while en route weather information is provided ad hoc from on-board observations by the pilot or by way of audio conversations with air traffic controllers during which general comments on the weather conditions are provided.

Thus, general aviation pilots have difficulty obtaining pertinent and timely in-flight weather information to allow them to accurately detect weather trends along the flight route and thereby avoid the inclement weather. As an example, assume the pilot is given weather information and weather maps at the airport prior to departure, for example from Chicago, and also weather information along the route and at the intended destination, for example, Louisville. During the flight of several hours the weather along the flight route and at the intended destination could change drastically. The pilot may learn of these weather changes en route from disjointed information sources, such as air traffic controller conversations, but the information can be incomplete, may lack the desired accuracy and may not be timely.

Weather information can also be periodically collected and provided through a satellite communications system. See for example, U.S. Pat. No. 6,014,606. Weather information is collected from throughout a global region, periodically assimilated and compiled at a central source, sent via a high speed data link to a satellite communications service, up linked to the satellite, and then transmitted to an aircraft in flight. As discussed above, such systems are generally too expensive for general aviation aircraft and further require the installation of specialized satellite receivers and antennas on the aircraft.

Although existing systems provide data and voice communications between the cockpit and ground, none are aptly suited for conveying detailed weather data in the form of weather products. It is desirable to deliver certain of the weather products at a refresh rate of six to ten minutes, especially the weather products that include radar imagery data, since this information is very time-perishable (the typical refresh rate at each radar site is six minutes). Thus a dedicated, readily available and relatively inexpensive weather product communications system would be beneficial.

The use of a television signal vertical blanking interval for transmitting digital audio is well understood by those skilled in the art. See, for example, U.S. Pat. No. 6,330,334, Method and System for Information Dissemination Using Television Signals, and U.S. Pat. No. 5,929,922, Method for Broadcasting Digital Audio Over Television Vertical Blanking Intervals. However, these patents disclose the use of the vertical blanking interval only for the purpose of transmitting audio signals.

SUMMARY OF THE INVENTION

The present invention discloses a method and apparatus for communicating weather information from a weather products generator to a mobile vehicle. The weather products, which are formed in response to data collected by various weather condition sensors, are broadcast to the mobile vehicle during the broadcasting of a television signal. In one embodiment, the weather products modulate the vertical blanking interval of the television signal. Other transmitting processes can also be employed in lieu of the television signal.

BRIEF DESCRIPTION OF THE DRAWINGS

The foregoing and other features and advantages of the invention will be apparent from the following detailed description of the invention, as illustrated in the accompanying drawings, in which like numbered reference characters refer to the same elements throughout the different figures. The drawings are not necessarily to scale, emphasis instead being placed on illustrating the principals of the invention.

DETAILED DESCRIPTION OF THE INVENTION

Before describing in detail the particular mobile vehicle weather information system according to the present invention, it should observed that the present invention resides primarily in a novel combination of processing steps and hardware components related to a weather information delivery system. Accordingly, these processing steps and hardware components have been represented by conventional processes and elements in the drawings, showing only those specific details that are pertinent to the present invention so as not to obscure the disclosure with details that will be readily apparent to those skilled in the art having the benefit of the description herein.

Although described with reference to an aircraft weather information system, the teachings of the present invention are applicable to weather information systems for all mobile vehicles.

Figure 1:
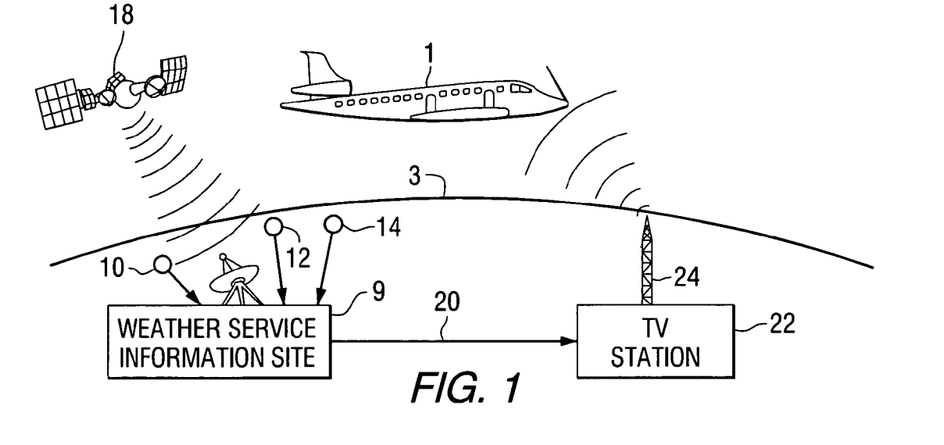
FIGS. 1 and 2 are block/pictorial diagrams of a weather information dissemination system for mobile vehicles according to the present invention.

FIG. 1 is a block/pictorial diagram illustrating an aircraft weather data collection and transmission system according to the present invention. An aircraft 1 is shown in flight over a global region 3. Typically, the global region 3 covers a large geographic region, such as the continental United States. In another embodiment of the present invention the weather data collection and transmission process can be carried out over a larger extended global region. Information describing the weather conditions within the global region 3 is periodically collected at a plurality of weather service information sites 9 from various weather information collection sources, identified by sensors 10, 12, and 14, one of which can include a weather radar. These sensors provide, for instance, information related to temperature, barometric pressure, humidity, wind direction, wind speed, visibility, cloud cover, freezing level, icing potential and precipitation information both at the surface and aloft. The presence of hail, lightning strikes and thunderstorms can also be detected. Weather information is also collected from one or more weather satellites 18 in orbit around the earth. As is known, many such weather service information sites 9 are situated in the continental United States and other regions of the globe.

At the weather service information site 9, various weather products are created based on input data from the sensors 10, 12, and 14, and the weather satellite 18. An exemplary weather product comprises a map showing the regions of equal barometric pressure across the continental United States. Another weather product comprises weather radar imagery data showing precipitation intensity at various altitudes, and still another shows the weather conditions surrounding one or more airports. Typically, the weather products use standard meteorological symbols and colors for consistency in displaying the many different types of weather information.

After formation of the weather products from the sensor data, they are transmitted via a communications link 20 to a television broadcasting station 22. From there, according to one embodiment of the present invention, the weather products are transmitted via an antenna 24 to the aircraft 1. In one embodiment, transmission of the weather products occurs during the vertical blanking interval of the television signal transmitted by the television broadcast station 22 to local television receivers (not shown in FIG. 1) on its assigned television channel frequency.

Use of the vertical blanking interval of existing television stations provides a convenient and readily available transmission source operating on a known fixed frequency for sending the weather products to the aircraft 1. Preferably, the data bits representing the weather products amplitude modulate the television carrier signal during the vertical blanking interval of a television picture field. Since the television signal can also be received by ground-based and marine-based (up to about 75 miles offshore) mobile vehicles in the service area of the television station, the weather products are readily available to all such vehicles using a common television signal receiver equipped to demodulate and decode the vertical blanking interval signal.

Because the vertical blanking interval has a fixed and relatively narrow bandwidth, in one embodiment the weather products can be compressed before modulating the television carrier signal. For those weather products comprising radar imagery data, one such compression scheme is disclosed and claimed in the commonly-owned patent application entitled Compression Method for Aviation Weather Products, filed on Nov. 8, 2001 and assigned application Ser. No. 10/007,333. Compression of the weather products allows more information to be provided to the aircraft more frequently and/or at a higher rate, to ensure timely information is available to the pilot for making en route flight decisions. Although data compression is advantageous, it is not required according to the teachings of the present invention.

Since other techniques for transmitting the weather data to the mobile vehicle are contemplated according to the teachings of the present invention, various data compression techniques can be employed dependent on the bandwidth, data rate and noise characteristics of the transmission channel. The rate at which weather products are transmitted and the data content of each can also be adapted to the transmission channel. For example, for a relatively low data-rate channel, the weather products can include primarily textual information, minimizing the image information due to the high data-rate/bandwidth requirements for images.

In a preferred embodiment of the invention, delivery of weather products every 10 to 12 minutes is generally considered acceptable. It is especially important to provide timely weather information since weather systems can move rapidly into and out of the intended route of the mobile vehicle. Although the weather products can be sent less frequently, this may not adequately serve the intended purpose and ensure that the pilot makes an early and accurate identification of problem weather areas so that the aircraft 1 can be routed along a different vector to avoid the area of disturbed weather.

It is also recognized that as larger quantities of data are broadcast to the aircraft 1, the transmission time is extended and therefore updated weather products may not be timely broadcast on a satisfactory schedule. Data compression can be employed to reduce the transmission time and thereby allow for more frequent updating of the weather products.

In one embodiment, the weather products are broadcast by the television stations comprising a network of affiliated stations. Thus the weather products from the weather service information site 9 are sent to one or more network transmission facilities for relaying to the individual affiliated stations. The weather products are then broadcast by the affiliates during the vertical blanking interval of the television signal. Use of network facilities to communicate the weather products from the information sites 9 to the broadcast sites simplifies the transmission process. In another embodiment, individual broadcast stations are identified for transmitting the weather products to mobile vehicles, and the weather products are sent directly from the information sites 9 to the identified stations. Generally, the weather products transmitted to a television broadcast station, whether through the network facilities or individually to each station, include only those products pertinent to the geographic area served by the television station.

The weather service information site 9 creates various weather products for transmission to the mobile vehicle, for example the aircraft 1. In various embodiments of the present invention, these products comprise radar, alphanumeric, grided and graphical weather products. As is known to those skilled in the art, each product can also include one or more of the weather data collected by the sensors identified above.

Within the aircraft 1 the data can be continually received and decoded upon receipt or received and displayed at predetermined intervals. For example, if the weather information is broadcast at known intervals and thereafter repeated during a given interval, the receiving apparatus can be controlled to receive the weather products whenever a new product is first transmitted. Alternatively, if several weather products are transmitted in an interval, the receiving apparatus can be controlled to receive only those products that are of interest to the pilot of the aircraft 1. Weather products that are continually transmitted can be continually received if desired, and continually decoded.

Certain of the weather products present raw observational data that may require some level of interpretation for use by the pilot, an effort that will detract from the other tasks that pilot must perform to fly the aircraft 1. Thus it is beneficial for the pilot to be presented with weather products that include interpretative and summary data. Meteorologists generate weather products providing such information based on their analysis of the raw observational data, and synthesize raw data observations from several sources to make an accurate forecast of future weather conditions. Further, the meteorologists can generate warning and advisory weather products for transmittal to the pilot. These interpretative weather products can take the form of textual or visual data that the pilot can quickly assimilate, and in response modify the en route flight path. Like all the other weather products, these interpretative and advisory products are communicated to the television station 22 for transmission to the aircraft 1 and to other mobile vehicles operative in the broadcast area. In one embodiment, warning products are immediately broadcast due to the time-critical nature of the data they contain.

The weather products are received at the aircraft 1 via a suitable antenna and receiver (neither illustrated in FIG. 1), wherein the receiver is tunable to the designated television signal frequencies on which the weather products are transmitted during the vertical blanking interval of the television picture. Receiver frequency tuning is dependent on the aircraft location, as determined by the navigation and location information available on the aircraft 1, and the frequency (i.e., channel) of the nearest television station transmitting the weather products. In one embodiment, a GPS (Global Positioning System) receiver provides a location-indicative input signal to the receiver. The receiver determines the nearest television station broadcasting the weather information and tunes to that frequency. As the aircraft 1 moves out of the area in which the television signal can be adequately received (for instance, when a metric such as the signal-to-noise ratio or bit error rate falls below a predetermined threshold) then the receiver automatically tunes to another television station signal frequency that provides an acceptable signal (i.e., above a predetermined signal metric threshold). Updated GPS location information can be used to retune the receiver.

According to the teachings of the present invention, wherever there is a television station that can provide an acceptable signal to the aircraft 1 as it traverses its flight path, the weather products are available for receiving by the aircraft. If there are flight path segments where an acceptable received signal is not available, and these segments are relatively short and minimal in number, then the loss of weather products while the aircraft traverses along those paths will not present a significant operational problem.

Figure 2:
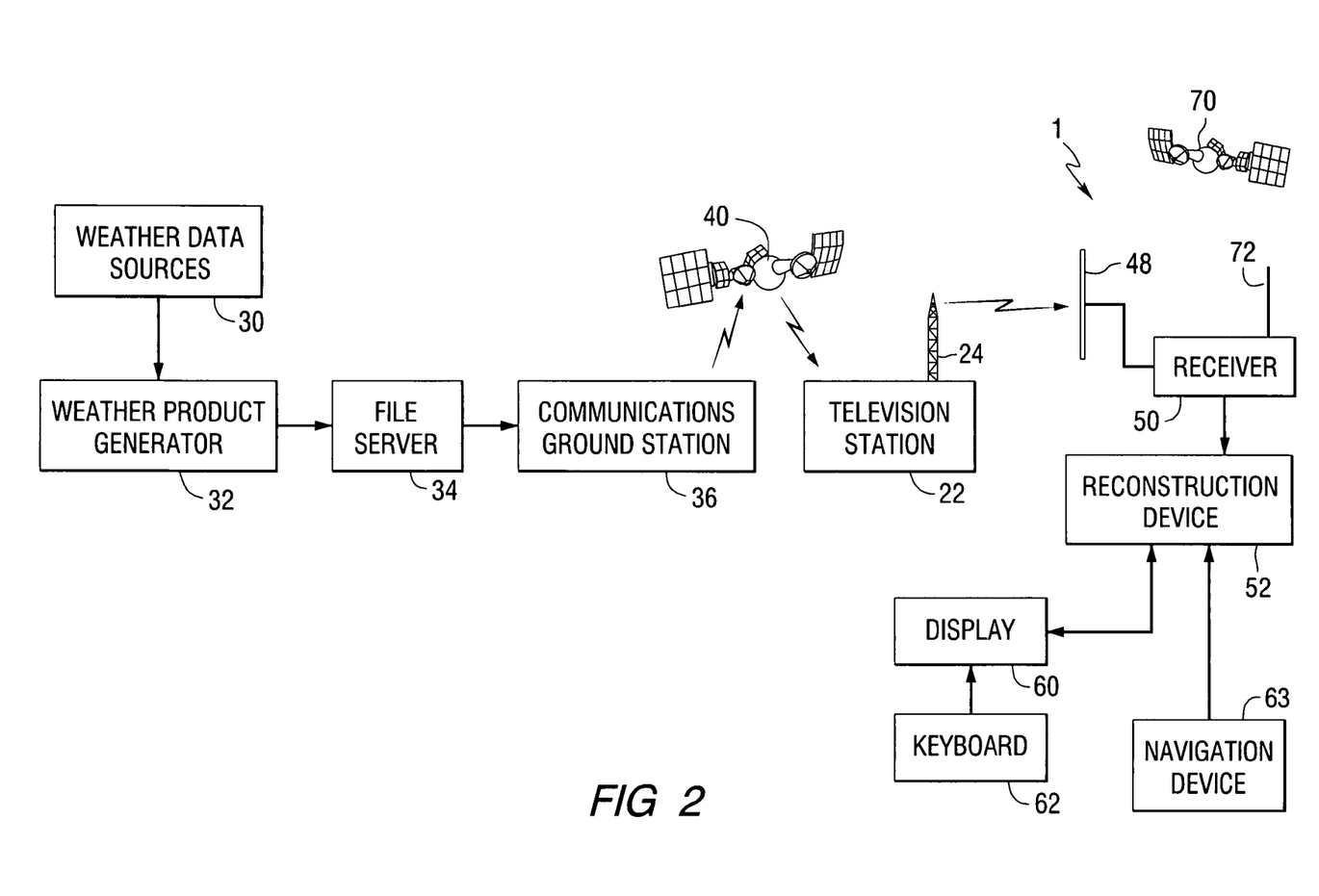

One embodiment of the system according to the teachings of the present invention is depicted in FIG. 2. Various weather products and raw weather data from sources 30 (for example the sensors 10, 12 and 14 and the weather satellite 18) are input to a weather product generator 32, which is intended to represent the process of creating weather products, including generation through the intervention of meteorologists as discussed above, the creation of textual weather products through the process of organizing and formatting the raw weather data, and the automatic creation of weather products and weather condition images.

Although the weather data sources 30 are shown as directly interfacing with the weather product generator, this is not necessarily required. Instead, the weather data can be stored on a server (not shown in FIG. 2) for downloading into the weather product generator 32 as required to generate new weather products.

A file server 34 is illustrated in FIG. 2 as receiving the weather products for storing, although this is not necessarily required as the products, once created, can be transmitted immediately to a communications ground station 36. From there, the weather products are transmitted to a television broadcast station 22. As described above, this can be accomplished using a network of affiliated television stations, in which embodiment the communications ground station 36 represents the communications center from which regular television network broadcasts are distributed to the affiliates, which may be accomplished via a communications satellite 40, but is not restricted to this particular form of communications. For instance, distribution of the output from the file server 34 could be sent via land lines or microwave links instead of by satellite. With reference to FIG. 1, the weather product generator 32 and the file server 34 illustrated in FIG. 2 can be included within the weather service information site 9.

At the television station 22 the weather products (in one embodiment in the form of a digital data stream) are transmitted via an antenna 24 by modulating the television signal carrier frequency (a radio frequency signal) during the vertical blanking interval of the television picture signal. The television signal is received by an onboard antenna 48 and receiver 50 within the aircraft 1. Advantageously, the antenna 48 is portable or easily installed by the user, supporting the mobility features of the present invention. In one embodiment the antenna 48 is affixed to the aircraft window. In another embodiment the antenna 48 is embedded within the aircraft window during manufacture, so as not to interfere with other aircraft transmitting and receiving devices.

The received signal is demodulated within the receiver 50 and supplied as an input to a reconstruction device 52, wherein, under control of a microprocessor, micro-controller or other processing device, the bit stream is detected and the weather product is reconstructed by known techniques. For example, in one embodiment the bit stream is encoded using a universal serial bus protocol to represent the textual and graphical information contained within the weather product. If the data was compressed before transmission, then it is uncompressed during the reconstruction process. Various suitable compression schemes are known to those skilled in the art. In one embodiment, data servers (not shown in FIG. 2) can be disposed between the receiver 50 and the reconstruction device 52 for storing the data bits prior to reconstruction. Later, in response to a command from the reconstruction device 52, the data is downloaded from the server and the weather products are reconstructed. Further, a server (not shown in FIG. 2) can be disposed between the reconstruction device 52 and the display 60, for storing the weather products until requested by the display 60.

The weather products are displayed on a display 60 for use by the pilot of the aircraft 1 or the operator of any mobile vehicle equipped to receive the weather products. In one embodiment, the weather product overlays a geographical map of the region. However, it is not necessary to transmit the map to the aircraft 1 as the map information can be stored within the reconstruction device 52 and the applicable map region loaded to the display 60 based on map identification and registration information provided with the weather products. For example, a weather product can include an indicator of the geographical region to which it pertains by simply using the GPS information for the aircraft location. When this indicator is detected by the reconstruction device 52, the appropriate map is downloaded from memory of the reconstruction device 52 and registered and displayed with the weather product. The map can also contain the location of the television stations transmitting the weather products and convert the x-y coordinate axes locations of the weather product to the latitude and longitude values for use by the pilot and the aircraft navigation system.

Figure 3:
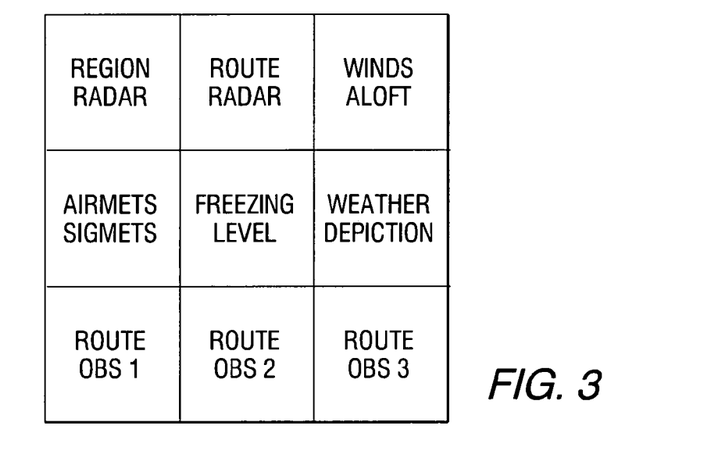
FIGS. 3 and 4 are displays associated with the weather information dissemination system of FIGS. 1 and 2.

In a preferred embodiment, the weather product is displayed using web browser software that includes the capability to move easily between the pages of a weather product and between weather products. The display can further include one or more menus of available weather products and can contain "hot" buttons for direct activation by the user to call-up pre-programmed weather products or to move forward and backward between weather products. Alternatively, the control of the menu functions can be obtained through the keyboard 62 shown in FIG. 2. FIG. 3 illustrates a plurality of such display hot buttons for use in controlling the displayed weather product. In response to user activation of the hot button, by tactile touch, a pen or a mouse, the weather product of interest is displayed on the display 60. Hot buttons also allow the pilot to pan the image in the left/right and up/down directions as illustrated in the exemplary display of FIG. 4. The "main" hot button in FIG. 4 returns the user to the first page of the weather product.

Figure 4:
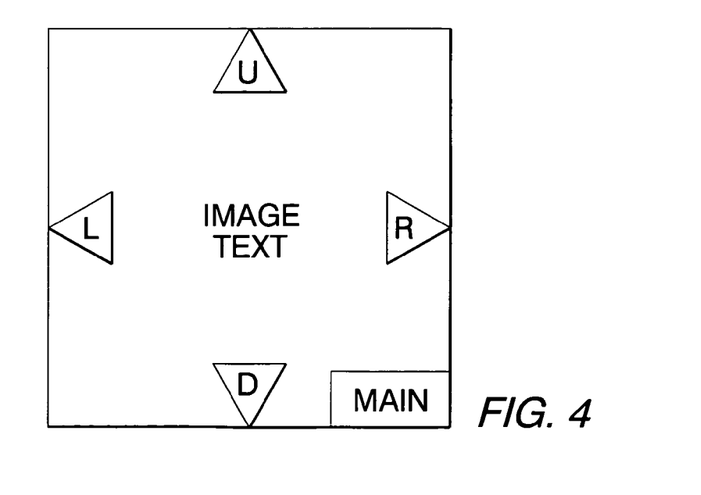

The user can also drill down to extract more detailed information than shown on the current display page. For example, the initial display can show weather information for a relatively broad geographic area, allowing the user to tentatively chart a path toward the destination. More detailed weather information for a region of the broader geographic area can be requested in response to activating hot buttons representing the such regions. Activating an airport icon calls up the weather products pertinent to the area surrounding the airport.

The display 60 includes a keyboard 62 for entering data for display and for controlling display of the weather products. The functions performed by the above mentioned hot buttons can also be performed through the entry of keyboard commands. The route way points can also be entered on the display through keyboard commands. With the way points displayed, the pilot user can determine the weather conditions over the projected route. The keyboard 62 (or an interactive display) provides an interactive capability, where, for instance the pilot requests certain customized weather products from the reconstruction device 52. Since the uplinked data stream carries all of the available weather products and weather information, the pilot can request specific products or weather information by command to the reconstruction device 52. Such commands cause the reconstruction device to control the receiver to receive and demodulate the selected weather products. Additionally, the command controls the reconstruction device 52 to generate specific weather products from the received data stream.

In another embodiment the transmitted weather products are segregated into service packs or tiers, with higher level tiers including more weather information than lower level tiers. The pilot selects and pays for a subscription service to gain access to the transmitted weather products of a service pack. In response to the purchased service pack, the reconstruction device 52 reconstructs the weather products associated only with that tier. Each of the transmitted weather products carries a header that uniquely identifies the included weather information. In response to the pilot's request, the reconstruction device 52 detects the header, selects the products within the pilot's service pack, processes the products and displays the results to the pilot.

In yet another embodiment, when a route of travel is identified and entered into a navigation device 63, the pertinent weather products for the route of travel and the destination point are created and stored in the reconstruction device 52 for later call-up by the pilot. As the aircraft 1 travels the route, the pertinent weather products are called up from the reconstruction device 52. The navigation device 63 also supplies location information to the reconstruction device 52 for controlling the reconstruction device 52 to display weather products for the current location.

As illustrated in FIG. 2, the on-board receiver 50 is also responsive to a GPS (Global Positioning System) satellite 70 via a GPS antenna 72 for providing location information to the pilot. The location information can also be displayed with the weather products. The GPS signal from the satellite 70 allows the receiver 50 to continuously update the aircraft position and thus the reconstruction device 52 supplies weather information for the current position.

In one exemplary embodiment, an iPAQ computer available from Hewlett Packard Inc. of Houston, Tex., is loaded with the software to perform the functions attributed to the reconstruction device 52. The display of the iPAQ computer provides the function of the display 60 and the integral keyboard serves as the keyboard 62.

In the embodiment where the weather products are presented as web pages, a web appliance can be used as the display device. In yet another embodiment, a fully-configured computer, such as a laptop computer, can serve as the display device. In this embodiment, it may not be necessary to use a server to store the weather data as the laptop computer may have sufficient storage capacity. Also, the reconstruction software can be stored in the laptop computer, obviating the need for a separate reconstruction device 52. Additionally, processing and display of the weather products on a portable device, such as a laptop computer (which could also advantageously include the receiving device or an interface to a separate receiving device, such as a cellular telephone), allows the user to employ the system without reliance on permanent installations in the mobile vehicle, and provides system mobility between different mobile vehicles owned or operated by the user.

Other portable display-capable devices, including a personal digital assistant and a broadband cellular telephone or integrated devices embodying these capabilities can be used to display the weather data. Such devices are connected to the reconstruction device 52 through an onboard local area network that can be wire or wireless based, or a combination of both infrastructures, within the aircraft.

Although the invention has been described above with reference to the use of the vertical blanking interval of the television signal for transmission of the weather products, they can also be supplied to the aircraft or other mobile vehicle via other transmission channels, including a CDMA (code-division multiple access) or G3 cellular system, or a radio broadcast signal (all of which are radio frequency signals).

Figure 5:
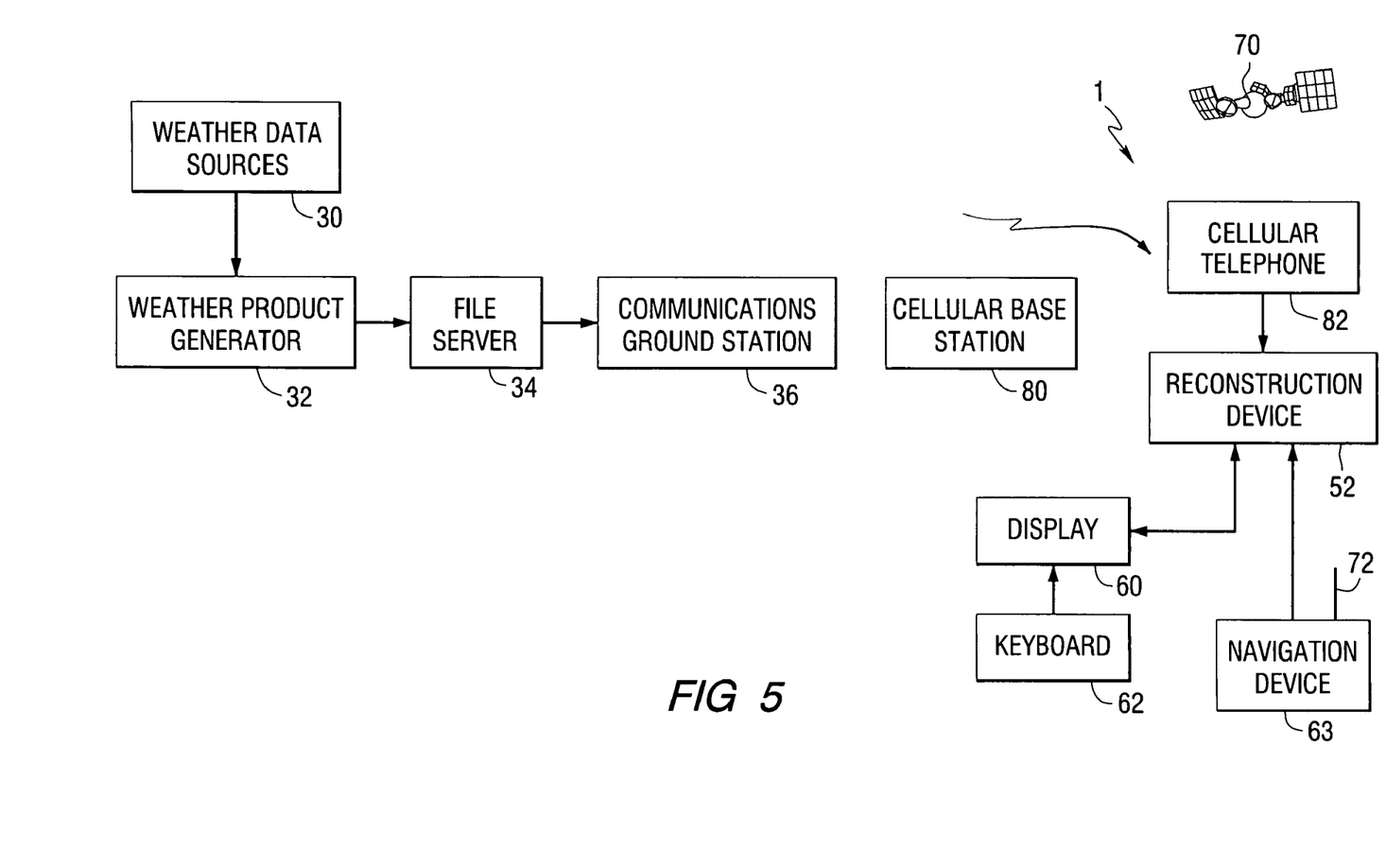
FIG. 5 is a block diagram of another embodiment of a weather information dissemination system according to the teachings of the present invention.

As illustrated in FIG. 5, the weather products are provided from a communications ground station to a cellular base station 80. The vehicle operator employs a cellular telephone 82 for calling the base station 80. In response, the weather products are transmitted to the cellular telephone 82. Feature-rich cellular telephones, such as those including web browser software, can display the weather products directly.

Other cellular telephones require interfacing to the reconstruction device 52, the display 60, the keyboard 62 and/or the navigation device 63.

The selection of a transmission channel from the various available transmission channels and transmission techniques may necessitate adaptation of the weather information dissemination system to the capabilities of the employed channel. For example, the data rate or bandwidth of the transmitted information can be lowered for transmission over a relatively narrow band channel. One technique for accomplishing this reduction minimizes the transmission of weather images. Alternatively, the duration between transmissions of updated weather products can be increased, only weather data changes transmitted or the weather data preprocessed prior to transmission to ameliorate any limitations associated with the transmission system. The data format can also be modified to accommodate the available bandwidth. Adaptation to a different transmission system is effectuated by use of an interface device (not shown) in the receiver 50 or the reconstruction device 52. According to the teachings of the present invention, multiple and alternative weather products, transmission systems and receivers can be used in the weather information and dissemination system. To do so, the weather products can be suitably processed (e.g., compressed) to provide timely and useful weather information, given the characteristics and limitations of the other system components.

In another embodiment, the weather products are supplied to the aircraft 1 (or another mobile vehicle) through an FM (frequency-modulation) radio broadcast signal. To provide the weather products to the FM stations, they are uploaded from the communications ground station to an orbiting satellite, and received at a plurality of FM radio station sites, through a suitable satellite receiving terminal (a very small aperture satellite terminal (VSAT), for example). The weather products are broadcast by each of the receiving FM stations over the FM signal sub-carrier authorization (SCA) channel transmitted from the station site.

Certain adaptive techniques can be employed in the system according to the teachings of the present invention. For example, in another embodiment, the file server 34 monitors the data rate bit stream comprising the weather products, and the rate at which the various weather products are being generated for transmission to the aircraft 1. In response to this information, the server alters the compression scheme (increasing or decreasing the compression ratio) or modify the resolution of the image data (and thus the number of bits required to display the images). For example, as a storm approaches, frequent weather advisories are issued as the weather conditions can change rapidly. These advisories may be compressed with a higher data compression ratio to ensure that all the advisories are immediately available to the pilots in the effected area. During quiescent weather periods a lower compression scheme can be used.

An architecture and process have been described as useful for providing weather information to a mobile vehicle. While specific applications and embodiments of the invention have been illustrated, the principles disclosed herein provide a basis for practicing the invention in a variety of ways and in a variety of embodiments. Numerous variations are possible within the scope of the invention. The invention is limited only by the claims that follow.

What is claimed is:

1. A method for disseminating weather information to a mobile vehicle, comprising:
   collecting weather data;
   forming weather products based on the weather data;
   providing the weather products to a plurality of broadcast stations; and
   transmitting the weather products from the plurality of broadcast stations coincident with the broadcast of a radio frequency signal for receiving at the mobile vehicle, wherein the mobile vehicle receives updated weather products from different ones of the plurality of broadcast stations as the mobile vehicle traverses a path.

2. The method of claim 1 wherein the step of transmitting the weather products further comprises modulating a television broadcast signal with the weather products during a vertical blanking interval of the television broadcast signal.

3. The method of claim 1 wherein the step of transmitting the weather products further comprises modulating a subcarrier authorization signal of an FM radio broadcast signal with the weather products.

4. The method of claim 1 further comprising providing the weather products to a satellite for transmission to the plurality of broadcast stations.

5. The method of claim 1 wherein the weather products are selected from text-based information, image-based information and weather alerts.

6. The method of claim 1 wherein the radio frequency signal is transmitted from a broadcast station, and wherein the weather products comprise weather information for the geographical area proximate the broadcast station.

7. The method of claim 1 wherein the weather products are displayed within the mobile vehicle in conjunction with a map of the geographic area to which the weather products pertain.

8. The method of claim 7 wherein the vehicle includes a data storage device, and wherein the map has been stored within the data storage device for display in conjunction with real time receipt of the weather products.

9. The method of claim 1 wherein the weather products are represented by a data bit stream, and wherein the step of transmitting the weather products comprises modulating the commercial radio frequency signal with the data bit stream.

10. The method of claim 9 wherein the step of transmitting further comprising compressing the data bit stream.

11. The method of claim 10 wherein the step of compressing the data bit stream comprises adaptively compressing the data bit stream.

12. The method of claim 11 wherein the weather products are generated at a generation rate and each weather product comprises data bits, and wherein the adaptive compression of the data bit stream is responsive to the generation rate and the number of data bits in the weather products.

13. The method of claim 1 wherein each weather product is assigned to a service pack, and wherein the step of broadcasting the weather products comprises broadcasting the weather products in the form of service packs, and further comprising at the mobile vehicle receiving one or more predetermined service packs of weather products.

14. The method of claim 13 wherein an operator of the mobile vehicle subscribes to receive one or more service packs, and wherein the predetermined service packs of weather products received at the mobile vehicle are responsive to the one or more subscribed service packs.

15. The method of claim 1 further comprising displaying the weather products with a web browser.

16. The method of claim 15 further comprising receiving, reconstructing and displaying the weather products on a portable communications receiving device in the vehicle.

17. The method of claim 1 wherein the step of transmitting the weather products comprises transmitting the weather products from the plurality of broadcast stations coincident with the broadcast of a radio frequency signal for receiving at the mobile vehicle, wherein the mobile vehicle receives updated weather products from different ones of the plurality of broadcast stations as the mobile vehicle traverses a path, and wherein each one of the updated weather products describes weather conditions proximate each one of the plurality of broadcast stations such that the mobile vehicle receives weather products related to a region of its path proximate each one of the plurality of broadcast stations.

18. A method for disseminating weather information to a mobile vehicle, comprising:
    collecting weather data;
    forming weather products based on the weather data; and
    transmitting the weather products as one or more of text and graphics from base stations of a cellular telephone communications system, wherein the mobile vehicle receives updated weather products as the mobile vehicle traverses a path.

19. The method of claim 18 wherein the cellular telephone communications system comprises an available bandwidth for transmitting the weather products, the method further comprising adaptively preprocessing the data bit stream to accommodate the available bandwidth.

20. The method of claim 19 wherein the step of adaptively preprocessing further comprises compressing the data bit stream to accommodate the available bandwidth.

21. The method of claim 18 wherein the weather products are selected from text-based information, image-based information and weather alerts.

22. The method of claim 18 wherein the step of transmitting is executed in response to a cellular telephone call by a user of the mobile vehicle.

23. An apparatus within a mobile vehicle for receiving signals representing weather products broadcast by a plurality of broadcast stations, the apparatus comprising:
    a receiver for receiving the signals from different ones of the plurality of broadcast stations as the mobile vehicle traverses a path, wherein the signals comprise updated weather products;
    a reconstruction device for forming the weather products from the signals; and
    a display responsive to the reconstruction device for displaying the weather products.

24. The apparatus of claim 23 wherein the receiver is automatically tuned to the frequency of the commercial broadcast station in the area where the apparatus is located.

25. The apparatus of claim 23 further comprising a navigation device for determining the current position of the apparatus, wherein the reconstruction device is responsive to the navigation device for reconstructing weather products depicting weather at the current position of the apparatus.

26. The apparatus of claim 23 wherein the weather products are in the form of web pages, and wherein the display device further comprises a web page browser for displaying the weather products.

27. The apparatus of claim 26 wherein the web page browser is controllable to display successively more detailed weather products.

28. The apparatus of claim 26 further comprising a web page server for storing the web pages for retrieval by the web page browser.

29. The apparatus of claim 23 wherein the display displays a geographical map in conjunction with the displayed weather products.

30. The apparatus of claim 23 further comprising weather data sources, wherein the weather products are generated at a weather products generator in response to the weather data sources.

31. The apparatus of claim 23 wherein the reconstruction device further comprises a controllable input device for directing the reconstruction device to form a specified weather product from the signals.

32. The apparatus of claim 23 wherein the reconstruction device and the display comprise one of a portable computer, a personal digital assistant and a portable communications device.

33. The apparatus of claim 32 wherein the portable communications device further comprises a data processor, a display, and a human interface for input and output control.

34. An apparatus for receiving signals representing weather products transmitted by a cellular network to a mobile vehicle, the apparatus comprising:
- a cellular telephone for requesting transmission of the signals;
- a receiver adapted for operation within the mobile vehicle, the receiver for receiving the signals transmitted from different cellular base stations of the cellular network as the mobile vehicle traverses a path, such that mobile vehicle receives updated weather products during traversal of the path;
- a reconstruction device for forming the weather products from the signals; and
- a display responsive to the reconstruction device for displaying the weather products.

* * * * *